UNITED STATES PATENT OFFICE.

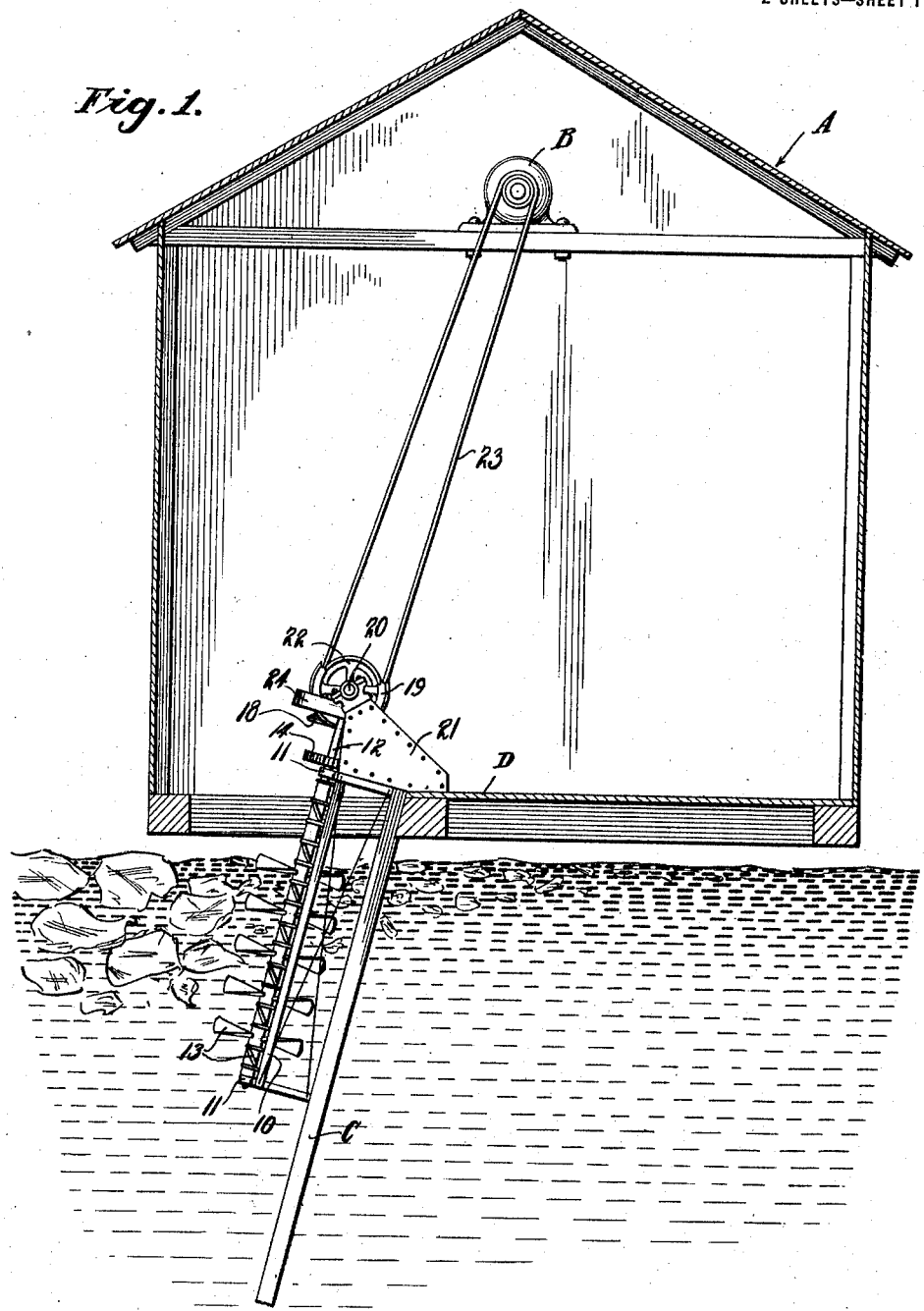

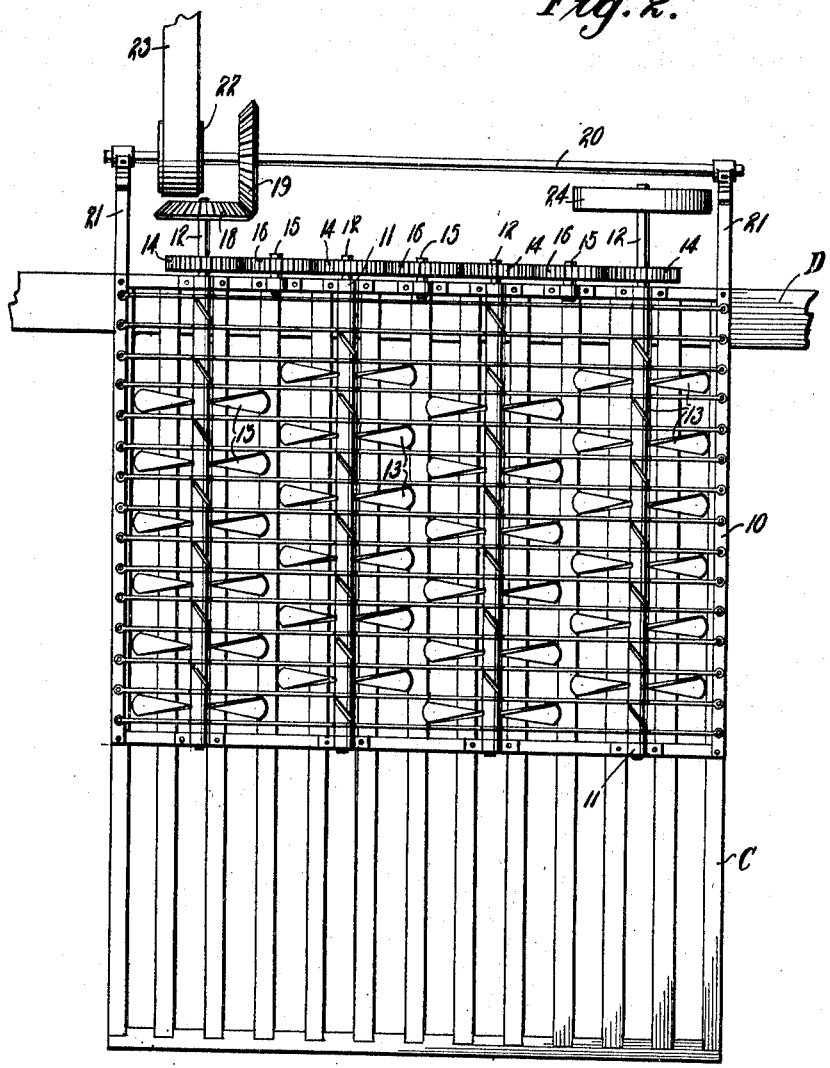

THEODORE FIRME, OF TOLLESTON, INDIANA.

ICE-BREAKER.

1,316,150.  Specification of Letters Patent.  Patented Sept. 16, 1919.

Application filed September 7, 1918.   Serial No. 253,118.

*To all whom it may concern:*

Be it known that I, THEODORE FIRME, a citizen of the United States, residing at Tolleston, in the county of Lake and State of Indiana, have invented new and useful Improvements in Ice-Breakers, of which the following is a specification.

This invention relates to means for breaking up or destroying anchor ice which accumulates and clogs the grates at the entrance of water power flumes.

Considerable trouble and expense at water-power plants is occasioned by the flume grates being clogged with large pieces of anchor ice, which often results in shutting down the plants for the purpose of clearing the grates. This is usually done by clearing the ice from the top of the grates by hand, the process being so slow that much time is lost by this operation.

The present invention aims to overcome these difficulties by providing a device located at the entrance of the flumes which will crush or break the ice into small pieces and direct them to the top of the water passing through the flume, where they may be removed if desired.

More specifically stated, the invention includes a plurality of spaced propeller blades located at the entrance of the flume in advance of the grate, so as to prevent the ice from reaching the said grate, the blades being so arranged as to direct the broken ice upward to the surface of the water.

In the drawings:—

Figure 1 is a sectional elevation illustrating the application of the invention; and Fig. 2 is a face view of the invention *per se*.

In illustrating the application of the invention, there is shown a power house or shed A, in which there is positioned a motor B used for driving the propeller blades hereinafter referred to. Grate bars C are located in their usual position at the entrance of the flume, the said grate bars being inclined and having their upper ends connected to the floor D of the power house or shed A.

Secured to the floor D is a frame 10, preferably of rectangular formation, the said frame being provided with a plurality of alined bearings 11, in which are mounted shafts 12. These shafts have secured thereto throughout their lengths, propeller shaped blades 13, the said blades being sufficiently close together and of a proper length to practically occupy the entire space within the frame 10.

Mounted upon each of the shafts 12 is a gear 14 and mounted upon shafts 15 carried by the frame 10 are idler gears 16, one of said gears being interposed between each of the gears 11 and meshing therewith, so that a rotation of one gear will operate the remaining gears to rotate all of the shafts. One of the shafts 12 has mounted upon its outer end a beveled gear 18, which is driven by a similar gear 19 mounted upon a shaft 20, the latter being secured in bearings carried by bracket plates 21 secured to the floor D of the house or shed A. Also mounted upon the shaft 20 is a pulley 22, which is driven by a belt 23, of the motor B as shown in Fig. 1 of the drawings. If desired a fly wheel 29 may also be mounted upon one of the shafts 12.

In the use of the invention, the frame is positioned beneath the water in advance of the grates C located at the entrance of the flume. A rotation of the blade will crush the large pieces of anchor ice traveling in the direction of the grates, while the rotation of the propeller like blades will also serve to direct the broken pieces of ice upward toward the top of the water, where if desired, they may be removed.

The invention is susceptible of various changes in its form, proportions and minor details of construction and the right is reserved to make such changes as are commensurate with the scope of the appended claims.

Having described the invention, what is claimed is:—

1. The combination with a flume and a vertically disposed deflector grate therein, of a plurality of substantially vertically arranged rotatable blades located in advance of the grate for breaking up anchor ice and means for rotating said blades.

2. The combination with a flume and a vertically disposed deflector grate therein, of means positioned within the flume and supported upon said grate in advance thereof for directing anchor ice to the top of the flume.

3. The combination with a flume and a vertically disposed deflector grate therein, of a plurality of rotatably mounted propeller shaped blades arranged in substantially vertical parallel rows and located in advance of and carried by the grate and means for rotating the blades.

4. The combination with a flume and a vertically disposed deflector grate therein, of a frame adapted to be positioned transversely across the grate, a plurality of parallel shafts mounted for rotation in said frame, laterally extending blades carried by said shafts, gearing connecting the shafts and means for driving said gearing to rotate the blades.

In testimony whereof I affix my signature.

THEODORE FIRME.

Copies of this patent may be obtained for five cents each, by addressing the "Commissioner of Patents, Washington, D. C."